United States Patent [19]

Kaufman, Jr. et al.

[11] 4,303,819

[45] Dec. 1, 1981

[54] BOTTOM ENTRY OVEN

[75] Inventors: Harold B. Kaufman, Jr., New York; John P. McCarthy, College Point, both of N.Y.

[73] Assignee: DCA Food Industries, Inc., New York, N.Y.

[21] Appl. No.: 143,717

[22] Filed: Apr. 25, 1980

Related U.S. Application Data

[62] Division of Ser. No. 900,179, Apr. 26, 1978, Pat. No. 4,219,716.

[51] Int. Cl.³ .................... H05B 9/06; F24C 15/16; A21B 2/00; A21B 3/02

[52] U.S. Cl. .................... 219/10.55 R; 126/19 M

[58] Field of Search .................... 219/10.55 R, 10.55 A, 219/10.55 D, 10.55 F, 10.55 M, 10.55 C; 126/19 M, 340; 250/455

[56] References Cited

U.S. PATENT DOCUMENTS

| | | | |
|---|---|---|---|
| 366,733 | 7/1887 | Millett | 126/340 X |
| 2,133,639 | 10/1938 | Smith et al. | 126/340 |
| 2,146,688 | 2/1939 | Selig | 250/455 |
| 2,253,250 | 8/1941 | Selig | 250/455 |
| 2,253,251 | 8/1941 | Selig | 250/455 |
| 2,733,650 | 2/1956 | Williams | 219/10.55 R X |
| 2,889,442 | 6/1959 | Schultz | 126/19 M |
| 2,944,540 | 7/1960 | Littell, Jr. | 126/340 |
| 3,294,879 | 12/1966 | Jacobs | 219/10.55 M X |
| 3,363,080 | 1/1968 | Lamb et al. | 219/10.55 R |
| 3,534,676 | 10/1970 | Rubino | 219/10.55 R X |
| 3,670,746 | 6/1972 | Gehrmann | 219/10.55 R X |
| 3,784,776 | 1/1974 | Asanuma | 219/10.55 C |
| 3,823,294 | 7/1974 | Takayama et al. | 219/10.55 C |
| 3,854,024 | 12/1974 | Kaufman, Jr. et al. | 219/10.55 A |
| 4,037,071 | 7/1977 | Kaufman, Jr. et al. | 219/10.55 F |

FOREIGN PATENT DOCUMENTS

| | | | |
|---|---|---|---|
| 1265371 | 4/1968 | Fed. Rep. of Germany | 219/10.55 A |
| 2259310 | 6/1974 | Fed. Rep. of Germany | 219/10.55 R |
| 1165535 | 10/1969 | United Kingdom | 219/10.55 R |

*Primary Examiner*—Gerald P. Tolin
*Assistant Examiner*—Keith E. George
*Attorney, Agent, or Firm*—Amster, Rothstein & Engelberg

[57] ABSTRACT

A microwave oven is disclosed which is especially useful for rapidly reconstituting frozen food products. The oven includes a microwave cavity having a bottom hatch which is movable between an open position at which food to be heated or cooked can be loaded onto the hatch from outside the oven, and a closed position whereat the food is disposed within the cavity for heating or cooking by electromagnetic energy. The hatch can be manually closed and, after a preset cooking time, automatically opened by gravity. Also disclosed is a heat shield assembly mounted for movement relative to the bottom of the cavity, so that when the hatch is in its open position and electric (IR) heat is provided to supplement microwave heating in the cavity, the assembly covers the bottom of the cavity to prevent heat from radiating below the cavity when the food is supported on or removed from the movable hatch. Accordingly, each batch of the food undergoes a uniform energy exposure, regardless of the time it may be left unattended below the cavity after the hatch is returned to its open position. The oven can be cycled rapidly to provide an adequate supply of food products when used in a retail establishment.

4 Claims, 6 Drawing Figures

BOTTOM ENTRY OVEN

This is a division of application Ser. No. 900,179 filed Apr. 26, 1978, now U.S. Pat. No. 4,219,716.

DESCRIPTION OF THE INVENTION

The present invention relates generally to ovens, and more particularly to ovens including a microwave cavity for heating or cooking food.

Microwave cooking ovens are well known in the food processing art, and have been commercially successful both in the home kitchen and retail trade. For example, present day "fast food" retail establishments commonly rely on such ovens to readily dispense foods such as hamburgers and frankfurters, which may be supplied and stored in a raw frozen state. The ovens quickly heat and cook these food products, and they can often be operated directly by a customer.

An example of a microwave cooking oven, suitable for use in commercial installations, appears in U.S. Pat. No. 3,363,080 to Lamb, et al. The patented oven is constructed with a view towards customer use. Accordingly, it includes a movable lower section onto which the customer places food to be cooked. Controlled power means raises the lower section to bring the food within a cooking cavity, and to close the cavity whereupon a selected cooking cycle begins. When the cycle is completed, the power means moves the lower section downwardly to allow the cooked food to be removed by the customer.

It will be appreciated that the Lamb oven has several disadvantages which tend to limit the scope of its application. For example, the oven depends on power means to facilitate its operation and, consequently, may undergo considerable down time in the event of a failure of the drive motor, or of the driving mechanism for raising and lowering the movable lower section.

Of particular significance is the inability of an oven such as that of the '080 patent to insure a uniform energy exposure to a given good product so that the product is heated or cooked to a desired degree. Specifically, upon the completion of an energy exposure cycle for a food product placed within the oven cavity, although the food is lowered down from the cavity, it may well continue to be exposed to heat from within the cavity if electric (infrared) energy is maintained within the cavity over the course of the oven cycles. In addition, should the customer place his or her hands in the vicinity of the oven cavity bottom when removing food from the lowered section, the electric heat emitted from the cavity may also cause burns or other injuries to the hands.

Accordingly, it is an object of the present invention to provide an oven including a cavity having a movable bottom hatch on which food products can be manually elevated into the cavity for heating therein and thereafter lowered by gravity along with the hatch, without power assistance.

It is another object of the present invention to provide a bottom entry oven including a cavity having a movable bottom hatch on which food to be heated can be placed, and further including a heat shield assembly operative to close the bottom of the cavity when the hatch is lowered, thereby preventing residual heat from radiating down from the cavity onto the food.

It is yet another object of the present invention to provide a bottom entry oven capable of providing uniform energy exposure cycles to food products to be heated within the oven.

It is still another object of the present invention to provide a bottom entry oven which is especially useful for reconstituting frozen food products and which may be easily and quickly operated by an attendant.

In accordance with an illustrative embodiment demonstrating objects and features of the present invention, there is provided an oven including a cavity having a bottom opening and a movable bottom hatch. The hatch is mounted for movement between an open position below the cavity whereat food to be heated in the oven can be loaded on the hatch, and a closed position at which the hatch closes the bottom opening of the cavity and brings the food into energy-absorbing relationship inside the cavity. A lifting handle, which is accessible from outside of the oven and is coupled to the movable hatch by a flexible linkage, operates to raise the hatch to its closed position. Locking means mounted to the oven housing releasably holds the hatch in the closed position for a predetermined oven cycle time. When the oven cycle is complete, the locking means releases the hatch which then moves to its open position without power assistance.

In a preferred embodiment of the present invention, a heat shield assembly is provided which is mounted for pivotal movement with respect to the bottom opening of the cavity. Actuator plates on the hatch operate to move the heat shield assembly from a closed position wherein the assembly seals the bottom opening of the cavity to prevent heat from radiating below the cavity, to an open position wherein the assembly is disposed within the cavity.

The above description, as well as further objects, features and advantages of the present invention will be more fully understood by reference to the following detailed description of the presently preferred, but nonetheless illustrative embodiment in accordance with the present invention, when taken in conjunction with the accompanying drawings, wherein.

Figure 1:
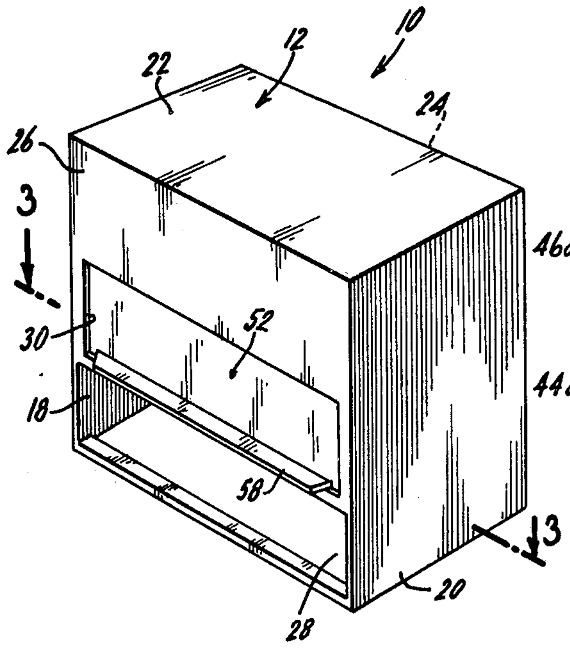
FIG. 1 is a perspective view of the oven of the present invention.
Figure 2:
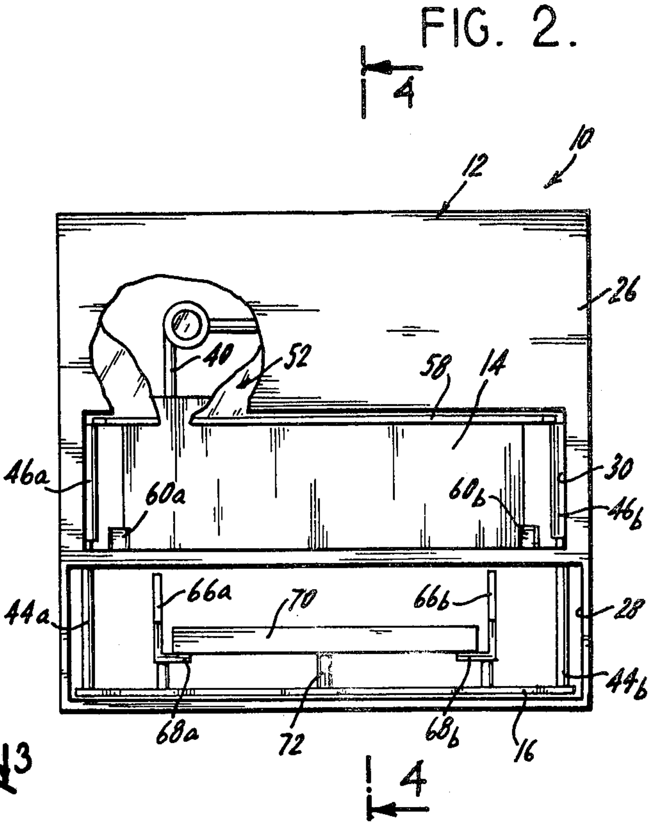
FIG. 2 is a partially broken, front elevational view of the oven of FIG. 1.

Referring now in detail to the drawings and particularly to FIGS. 1 and 2 thereof, there is shown an illustrative oven embodying features of the present invention, generally designated by the reference numeral 10.

The oven 10 generally includes an outer housing 12 of stainless steel or like sturdy material, and is preferably in box-like form as shown. Within the housing 12 are mounted a cavity 14 for heating food products when energized by a conventional high frequency electromagnetic source (unshown), and a movable bottom hatch 16 onto which food products can be placed from outside the oven 10 and moved into energy absorbing relationship within the cavity 14.

Referring to FIG. 1, housing 12 includes a pair of spaced-apart side walls 18 and 20, respectively, a closed top wall 22, a closed rear wall 24, and a front wall 26.

The front wall 26 includes an elongated rectangular opening 28 extending across its bottom portion, and another elongated rectangular opening 30 extending across its mid-portion. The purposes of openings 28 and 30 will be apparent as this description proceeds.

Figure 4:
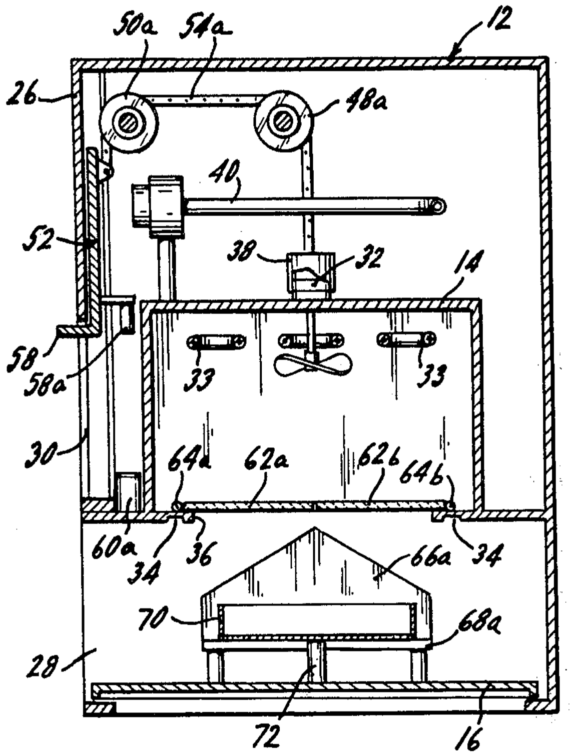
FIG. 4 is a sectional view taken along line 4—4 in FIG. 2.
Figure 5:
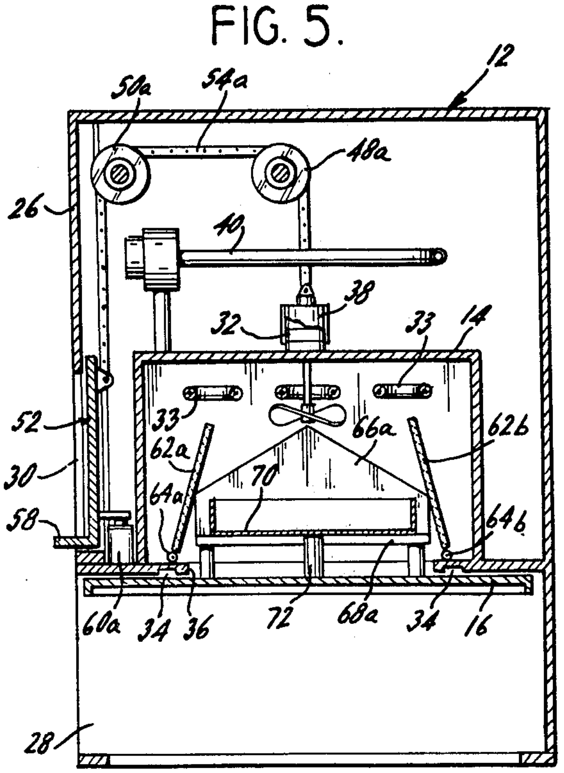
FIG. 5 is a sectional view as in FIG. 4 with the bottom hatch in its closed position.
Figure 6:
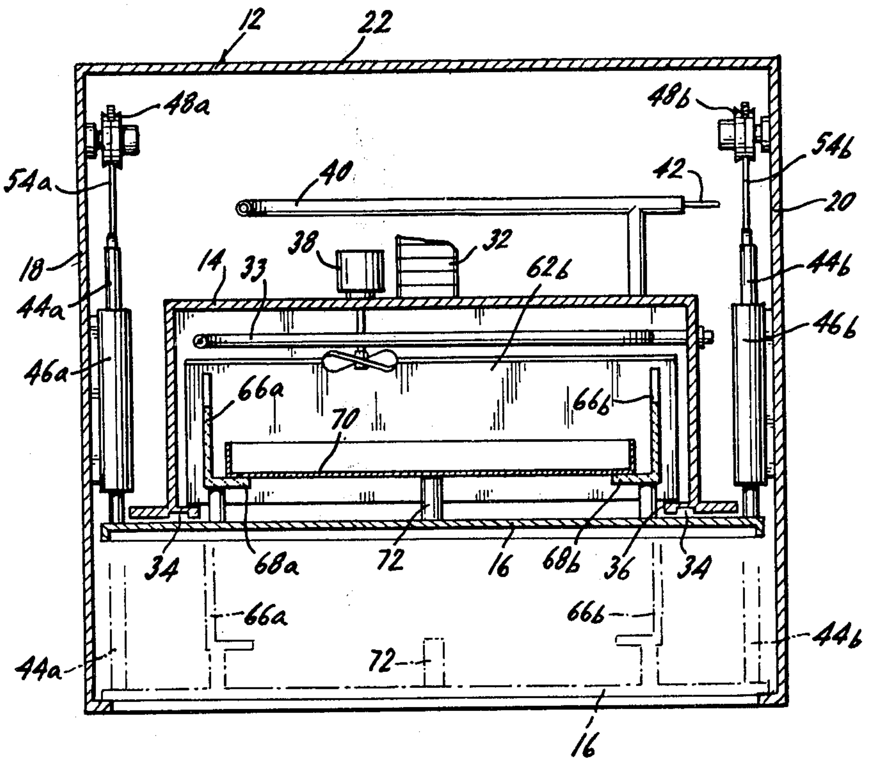
FIG. 6 is a sectional view taken along line 6—6 in FIG. 3.

Referring now to FIGS. 4, 5 and 6, the cavity 14 is coupled to an unshown source of electromagnetic energy by way of waveguide 32 which is preferably coupled to the top of the cavity 14. The electromagnetic energy source may be conventional and is preferably mounted within the housing 12 between the cavity 14 and top wall 22. It is also preferred that a number of electric (infrared) heating elements 33 be mounted within cavity 14, these elements being energized by an external current source (unshown).

Cavity 14 includes a choke flange 34 which faces inwardly and is contiguously joined to the bottom perimeter of the cavity 14, thereby defining an opening 36 in the bottom of cavity 14. As shown in FIGS. 4 and 5, flange 34 also preferably extends outwardly from cavity 14 to join the rear wall 24 and the forward wall 26 of the oven housing 12, thereby rigidly supporting cavity 14 within the housing 12.

Although it is not necessary for practicing the basic concept of the present invention, it is desired and preferred that a conventional mode stirrer assembly 38 be mounted at the top of cavity 14. Alternatively, a field distributing device such as one disclosed in U.S. Pat. No. 4,037,071, issued July 19, 1977, to H. B. Kaufman, Jr., et al and assigned to the assignee of the present application, may also be used. In such case, the patented distributing device would be suitably mounted atop the cavity 14 along with its associated apparatus as disclosed in the '071 patent.

Also, an air circulating system 40 including a temperature sensor 42 (FIG. 6) may be operatively mounted atop cavity 14. An example of an air circulating system which can be adapted for use in conjunction with the cavity 14 appears in U.S. Pat. No. 3,854,024, issued Dec. 10, 1974, to H. B. Kaufman, Jr., et al and assigned to the assignee of the present application. Basically, the system 40 circulates air through the cavity 14 by means of a blower which directs air into one upper corner of the cavity 14, and exhausts it from the cavity through tubing from the diagonally opposite corner atop the cavity 14, as shown in the drawings. An even temperature distribution within the cavity can thereby be attained. Alternatively, a temperature sensor can be mounted within cavity 14 for controlling the temperature therein by regulating the current which energizes the electric heating elements 33.

Continuing now with reference to FIGS. 2–6, the cavity bottom hatch 16 is mounted for substantially vertical movement within the oven housing 12 between an open position, at which the hatch 16 is at a level which substantially coincides with the bottom of the lower housing opening 28 (FIGS. 2 and 4), and a closed position at which the hatch 16 is operatively aligned with choke flange 34 at the bottom of cavity 14 (FIGS. 5 and 6). The preferred structure for mounting the hatch 16 for movement between its open and closed positions will now be described. Basically, this structure controls the motion of the hatch 16 so as to allow for smooth manual lifting and automatic gravity lowering of the hatch along with any food placed thereon. The structure includes a pair of hatch support rods **44*a* and 44*b*, a corresponding pair of sleeve bearings 46*a* and 46*b*, two pair of rotatable sprocket assemblies, a lifting handle 52, and flexible linkages 54*a* and 54*b*** coupled between the lifting handle and the hatch support rods, the linkages being guided and supported by the sprocket assemblies.

Figure 3:
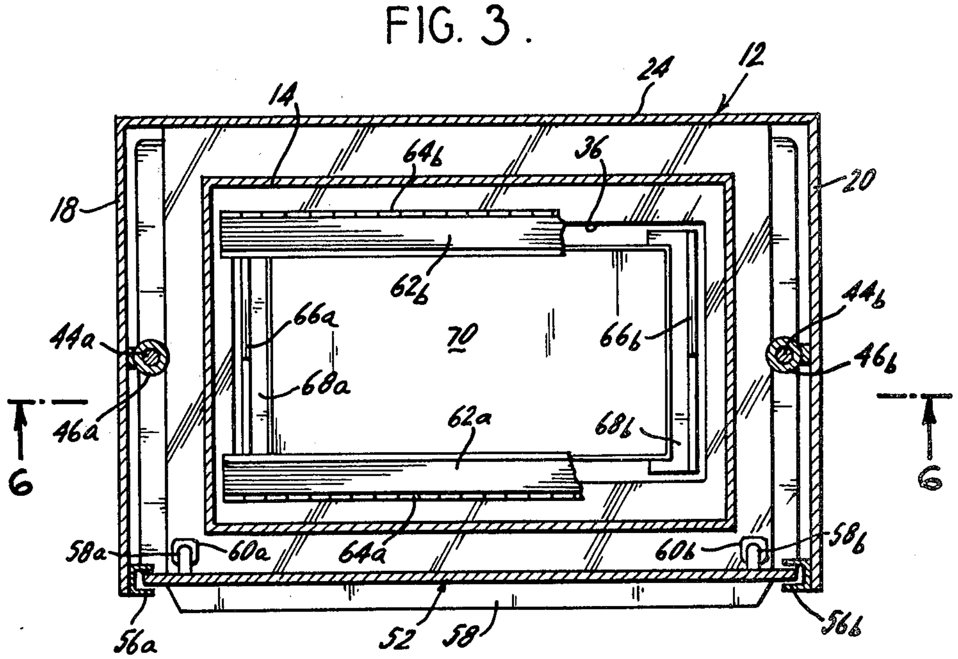
FIG. 3 is a sectional view taken along line 3—3 in FIG. 1.

Referring to FIG. 6, hatch 16 has a pair of support rods **44*a* and 44*b* extending substantially upwardly from its left and right sides, respectively, as shown. Rods 44*a* and 44*b* preferably coincide with the transverse medial line of the hatch 16, as shown in FIG. 3. These rods are securely joined at their bottom ends to hatch 16 so that they may support the entire weight of the hatch, including that of any food placed thereon to be heated or cooked within the cavity 14**.

In order that sideways movement of hatch 16 be restrained, a pair of vertically oriented sleeve bearings **46*a* and 46*b* are mounted to the inside surfaces of housing side walls 18 and 20 (FIGS. 3 and 6), respectively, for guiding the movement of the rods 44*a* and 44*b* and, hence, that of the hatch 16. Bearings 46*a* and 46*b* are positioned so that their openings are axially aligned with the hatch support rods 44*a* and 44*b*, respectively, when hatch 16 is properly oriented within the oven housing 12**. The diameter of the sleeve openings is such that the rods undergo smooth, vertical sliding movement therein with respect to the mounted sleeves.

To ensure that the hatch 16 is uniformly raised and lowered by the flexible linkages **54*a* and 54*b*, a pair of corresponding rotatable sprocket assemblies are mounted on the inside surfaces of the housing walls 18 and 20, respectively, for uniformly guiding and supporting the linkages (FIG. 6). These sprocket assemblies are aligned almost vertically above the sleeves 46*a* and 46*b*, respectively, and are slightly offset horizontally towards the front housing wall 26 for reasons discussed below. Another pair of rotatable sprocket assemblies are also mounted on the inside surfaces of housing walls 18 and 20, respectively. One of these assemblies is shown in FIGS. 4 and 5 and is designated by 50*a*. The other, which does not appear in the drawings, is mounted opposite sprocket assembly 50*a* on the inside of oven wall 20. The latter pair of sprocket assemblies are horizontally aligned with sprocket assemblies 48*a* and 48*b*, respectively, and are located close to the front wall 26 of the oven housing 12, as shown. With both pairs of sprocket assemblies oriented as described above, the flexible linkages 54*a* and 54*b* which connect the lifting handle 52 with the hatch support rods 44*a* and 44*b* are evenly supported and guided throughout their paths of movement by the sprocket assemblies when the bottom hatch 16 is being raised or lowered. Referring to FIGS. 4–6, the sprocket assemblies are desirably located on the insides of the oven housing side walls so that the linkages 54*a* and 54*b* each extend substantially vertically from the hatch support rods 44*a* and 44*b*, and from the lifting handle 52**.

The lifting handle 52 is preferably in the form of a door and is mounted for vertical sliding movement behind the central rectangular opening 30 through the oven front wall 26, as shown in FIGS. 1, 4 and 5. The movement of the handle 52 is guided by a pair of rectangular guide channels **56*a* and 56*b* mounted on the inside of housing side walls 18 and 20, respectively, as shown in FIG. 3. Handle 52 may include an outwardly facing lip 58 towards its bottom which extends horizontally through opening 30** for access by a user.

To facilitate locking the handle 52 in its lowermost position so as to maintain the cavity bottom hatch 16 closed, a pair of downwardly facing locking studs **58*a*** and 58*b* are mounted at each of the inside lower corners of the handle 52, respectively. These locking studs are axially aligned above a corresponding pair of electromagnetic solenoids 60*a* and 60*b* which are fixedly mounted on the inside of front wall 26 as shown in FIGS. 4 and 5. It will be understood that when the handle 52 is in its lowermost position, each of the locking studs 58*a* and 58*b* will be operatively disposed within each of the solenoids 60*a* and 60*b*, respectively, whereupon the handle 52 can be locked at the position shown in FIG. 5 when the solenoids 60*a* and 60*b* are energized. One or more microswitches (unshown) for controlling the energization of solenoids 60*a* and 60*b* can be placed in the path of movement of the lifting mechanism for actuation when the hatch 16 is in its closed position against the bottom of the cavity 14.

Regarding further details of the flexible linkages 54*a* and 54*b*, each of them is connected at one end to a corresponding upper inside corner of the handle door 52, and at their other ends to the tops of corresponding support rods 44*a* and 44*b*. It is preferred that all the linkage connections be pivoted to ensure smooth cooperative movement of the cavity hatch 16 and the lifting handle 52. The linkages 54*a* and 54*b* are preferably link chains having openings therein which operatively engage the associated sprocket assemblies.

By the above detailed construction, it will be understood that the lifting handle 52 can be steadily maintained in its lowermost position as long as the electromagnetic solenoids 60*a* and 60*b* are energized to magnetically engage the locking studs 58*a* and 58*b* on the handle 52. When solenoids 60*a* and 60*b* are de-energized, handle 52 is then free to move upwardly, and the weight of the cavity hatch 16, including that of any food thereon, will allow the hatch to be lowered by gravity to its open position (FIG. 4). The foregoing manual lifting, automatic locking and gravity return features of the oven 10 serve to distinguish it over prior ovens, and facilitate its operation especially when it is desired to successively reconstitute a number of frozen food products in a short amount of time.

In a preferred embodiment of the present invention, the oven cavity 14 includes a heat shield assembly comprising a pair of hinged plates 62*a* and 62*b*, mounted for pivotal movement with respect to the bottom of the cavity 14 by way of hinges 64*a* and 64*b*, respectively. Plates 62*a* and 62*b* are formed of rigid refractory material which is substantially transparent to microwave energy, and are complementarily shaped to rest end to end at a closed position, as shown in FIG. 4. Accordingly, the plates act to prevent heat from radiating below the bottom opening 36 of the cavity 14 when the movable cavity hatch 16 is in its open position for loading or removal of food. It will be appreciated that residual heat is developed within the cavity 14 by maintaining operation of the electric (infrared) energy sources coupled to the cavity, and it is desirable that such heat be contained within the cavity when a user places his or her hands below the cavity in the vicinity of the open hatch 16. Such containment is particularly desirable in order that electric heating elements 33 may be left on continuously inside the cavity 14 to enable a uniform heat exposure to each of a number of food products successively cycled in and out of the cavity 14 for heating or cooking. Without the heat shield plates 62*a* and 62*b*, food placed on the hatch 16 would continue to receive infrared heat exposure until removed from the hatch by the user.

Actuation of the heat shield plates 62*a* and 62*b* is preferably effected by a pair of rigid generally triangularly shaped actuator plates 66*a* and 66*b*. The actuator plates are substantially transparent to microwave energy and are mounted to the movable hatch 16 for communicating movement to the heat shield plates in timed relationship to the movement of the hatch as it moves between its open and closed positions.

As shown in FIG. 2, the actuator plates 66*a* and 66*b* each have right angle lips 68*a* and 68*b*, respectively. These lips face towards each other and are supported from hatch 16 so as to provide an elevated platform on which a food tray 70 can be positioned. Also, a center post 72 is preferably joined to the center of the hatch 16 for providing further support to the food tray 70 so that it does not sag from the weight of any food thereon.

Operation of the oven 10 according to the present invention will now be described.

A user desiring to heat or cook a food item simply places it on the food tray 70, and positions the tray 70 evenly on the platform lips 68*a* and 68*b* extending from the actuator plates. It will be appreciated that frozen food products to be reconstituted can be supplied and stored on a number of such trays, thereby facilitating use of the present oven 10 by a retail establishment. The user then lowers the lifting handle door 52 by exerting a downward force on the door lip 58, thereby moving the cavity hatch 16 to its closed position, as shown in FIG. 5, at which the food is brought into energy absorbing relationship inside the cavity 14. The lifting handle 52 is locked in this position by way of the locking studs 58*a* and 58*b* and solenoids 60*a* and 60*b*, which are energized at this time. Microwave energy then excites the cavity 14, and the food is heated or cooked for a predetermined cycle time by exposure to the microwave energy and to the electric (infrared) energy which is continuously present in the preferred embodiment. Choke flange 34, being in operative electrical relationship with the hatch 16, prevents microwave radiation from leaking out from the cavity 14 in the vicinity of the hatch.

It will be understood that during movement of the hatch 16 from its open position in FIG. 4 to its closed position in FIG. 5, the heat shield plates 62*a* and 62*b* are moved in unison by the actuator plates 66*a* and 66*b* from a closed position at which heat developed within the cavity 14 is prevented from radiating below the cavity 14, and an open position whereat each of the heat shield plates 62*a* and 62*b* is disposed within the cavity 14. Inasmuch as the material used to form the heat shield plates 62*a* and 62*b* is substantially transparent to microwave energy, these plates do not disturb the energy field such as to make it ineffective to heat or cook food brought within the cavity 14.

When the handle 52 is moved to its lowermost position to bring the food into the cavity 14, a timing cycle can be initiated by unshown conventional timing means so that the microwave energy source is turned on and the solenoids 60*a* and 60*b* are energized to hold the hatch 16 at its closed position for a predetermined oven cycle time. As already mentioned above, if electric heating elements 33 are included in cavity 14, it is preferred that they remain on continuously and that their operation therefore be independent of the hatch movement.

At the end of the time cycle, the microwave energy source is turned off, and the solenoids 60*a* and 60*b* are de-energized to permit the hatch 16 and the food thereon to fall by gravity to the position shown in FIG. 4, without power assistance. The heat shield plates 62*a* and 62*b* also fall by gravity to their closed position as the actuator plates 66*a* and 66*b* on the hatch 14 are lowered. The user may then withdraw the food from the oven 10, out through the lower access opening 28, without danger of burn injury from heat emitted below the cavity 14.

As mentioned earlier, the provision of the heat shield plates 62*a* and 62*b* is especially useful to provide uniform energy exposure to a number of food products which are reconstituted by heating in the oven 10 and left on the lowered hatch 14 to be removed by an attendant. For example, it is possible that in a retail establishment, an attendant may replenish the store's stock of reconstituted goods by successively cycling trays of frozen goods through the oven at a time when no customers are present. As trays of the heated, reconstituted goods are lowered on the hatch 16 to be removed through the access opening 28 by the attendant, it may happen that the attendant is unable to immediately remove the goods as one or more customers seeking his or her attention may have entered the store. However, as the heat shield plates 62*a* and 62*b* are in their closed position to prevent ambient heat developed within the cavity 14 from continuing to heat the goods, a prolonged energy exposure such as would detract from the tastiness and desirability of the goods is thereby avoided. It will be appreciated that this uniform energy exposure feature also serves to distinguish the present invention over prior ovens.

A latitude of variation, modification, change and substitution is intended in the foregoing disclosure. For example, it will be apparent to the worker skilled in the art that the particular configuration of the lifting mechanism described herein need not include the lifting handle door 52 as shown, but may rather comprise a conventional lever arrangement connected to one or more flexible linkages which, in turn, connect up with the hatch 16. Moreover, conventional spring loaded solenoid locking members may be used to engage and hold hatch 16 in its closed position against the bottom of the cavity 14, the solenoids being energized only to allow the hatch to drop at the proper time.

Rather than comprise the two complementary heat shield plates 62*a* and 62*b*, the cavity heat shield assembly may consist of a single heat shield plate of refractory material mounted for movement relative to the cavity 14, provided the dimensions of the cavity are such that the single plate can be disposed within the cavity without being obstructed when the hatch 16 is in its closed position.

Also, one or more separate platforms or tray supports may be provided on the hatch 16, rather than comprise the lips 68*a* and 68*b* on the heat shield actuator plates. For example, a set of tray supports mounted to the hatch could allow for the stacking of several trays at one time to increase the reconstitution or cooking capacity of the oven 10 over a single oven cycle.

Therefore, it is appropriate that the appended claims be construed broadly in a manner consistent with the spirit and scope of the invention.

What is claimed is:

1. An oven for providing uniform energy exposure to food products successively loaded therein during a heating cycle comprising a heating cavity having a bottom opening therein, a bottom hatch mounted for relative movement with respect to said heating cavity between a lowered position and a raised position, and means for moving said hatch between said lowered position and said raised position including a lifting handle assembly having a lifting handle accessible to the operator of the oven, means linking said lifting handle assembly with said hatch to enable downward force on said lifting handle to cause said hatch to be raised from the lowered position to the raised position including at least first and second hatch support rods each having a first end secured to said hatch at spaced locations thereon and extending substantially vertically upward therefrom, first and second sleeve bearings respectively surrounding said first and second hatch support rods and secured against movement therewith, said sleeve bearings being sized relative to such support rods to permit same to undergo sliding movement relative thereto, linkage member coupled between the second ends respectively of said hatch support rods and the lifting handle assembly, and latching means for maintaining said hatch in its closed position and upon completion of the heating cycle permitting the hatch to undergo controlled descent under the influence of gravity to its lowered position.

2. The oven of claim 1, wherein said linkage member includes first and second chain link assemblies each having a first end secured to the second ends respectively of said support rods and a second end secured to said lifting handle assembly and sprocket wheels for receiving and guiding said chain link assemblies during movement of said hatch.

3. The oven of claim 1, further including a pair of spaced rectangular guide slots formed in said oven for receiving opposite sides of said lifting handle for guiding the vertical movement of said lifting handle relative to said oven.

4. An oven for providing uniform energy exposure to food products successively loaded therein during a heating cycle comprising a heating cavity having a bottom opening therein, a bottom hatch mounted for substantially vertical movement between a lowered position and a raised position, and means for moving said hatch vertically between said raised position and said lowered position including a lifting handle assembly mounted for vertical sliding movement relative to the oven, a pair of spaced rectangular guide slots formed external to said heating cavity for guiding movement of said lifting handle assembly to maintain the relative vertical movement thereof, first and second hatch support rods oriented substantially vertically upward and having first ends secured to said hatch at positions to substantially coincide with the transverse medial line of said hatch, said hatch support rods being securely joined to said hatch to substantially support the entire weight thereof, first and second vertically oriented sleeve bearings secured external to said cavity against movement with respect to said cavity, a bearing surrounding each hatch support rod sized to permit said rods to undergo smooth vertical sliding movement of said rods, a flexible chain linkage assembly connecting the lifting handle assembly with the second ends of said hatch support rods, sprocket wheels for engaging said flexible chain linkage assembly to insure that the linkage assembly extends substantially vertically from the hatch support rods and from the lifting handle assembly, and latching means for maintaining said hatch in its closed position and upon completion of the heating cycle permitting said hatch to undergo controlled descent under the influence of gravity to its lowered position.

* * * * *